United States Patent
Erengil et al.

(10) Patent No.: US 11,530,037 B2
(45) Date of Patent: Dec. 20, 2022

(54) VERTICAL TAKE OFF AND LANDING AIRCRAFT

(71) Applicant: BOARD OF REGENTS, THE UNIVERSITY OF TEXAS SYSTEM, Austin, TX (US)

(72) Inventors: Mehmet E. Erengil, Austin, TX (US); Jayant Sirohi, Austin, TX (US); Fabrizio Bisetti, Austin, TX (US); Christopher G. Cameron, Cambridge, MA (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 16/962,891

(22) PCT Filed: Jan. 18, 2019

(86) PCT No.: PCT/US2019/014118
§ 371 (c)(1),
(2) Date: Jul. 17, 2020

(87) PCT Pub. No.: WO2019/143881
PCT Pub. Date: Jul. 25, 2019

(65) Prior Publication Data
US 2021/0061459 A1    Mar. 4, 2021

Related U.S. Application Data

(60) Provisional application No. 62/619,526, filed on Jan. 19, 2018.

(51) Int. Cl.
*B64C 39/00*    (2006.01)
*B64C 1/06*    (2006.01)
(Continued)

(52) U.S. Cl.
CPC ............ *B64C 39/001* (2013.01); *B64C 1/061* (2013.01); *B64C 3/141* (2013.01); *B64C 21/04* (2013.01);
(Continued)

(58) Field of Classification Search
CPC ....... B64C 39/001; B64C 1/061; B64C 3/141; B64C 21/04; B64C 29/0025;
(Continued)

(56) References Cited

U.S. PATENT DOCUMENTS 2,718,364 A * 9/1955 Crabtree ............... B64C 39/064
244/12.2
2,801,058 A * 7/1957 Lent ...................... B64C 39/064
244/12.2
(Continued)

FOREIGN PATENT DOCUMENTS

WO    2016/133427    8/2016

OTHER PUBLICATIONS

International Search Report and Written Opinion dated Apr. 8, 2019, from International Application No. PCT/US2019/014118, 9 pages.
(Continued)

*Primary Examiner* — Assres H Woldemaryam
(74) *Attorney, Agent, or Firm* — Meunier Carlin & Curfman LLC

(57) ABSTRACT

Embodiments described herein relate to a vertical take-off and landing aircraft, specifically an electric or hybrid electric aircraft having a plurality of ducted fans. The aircraft includes a plurality of axially oriented fans, laterally oriented fans, forward air intakes, side exit ports and rear exhaust ports. The aircraft achieves flight by capturing air in the intakes and diverting the air through the axially oriented fans or the laterally oriented fans through the channels selectively.

24 Claims, 10 Drawing Sheets

(51) Int. Cl.
  *B64C 3/14* (2006.01)
  *B64C 21/04* (2006.01)
  *B64C 29/00* (2006.01)
  *B64D 27/02* (2006.01)
  *B64D 27/24* (2006.01)
  *B64D 33/02* (2006.01)
  *B64D 33/04* (2006.01)

(52) U.S. Cl.
  CPC .......... *B64C 29/0025* (2013.01); *B64D 27/02* (2013.01); *B64D 27/24* (2013.01); *B64D 33/02* (2013.01); *B64D 33/04* (2013.01); *B64C 2003/142* (2013.01); *B64C 2003/143* (2013.01); *B64D 2027/026* (2013.01)

(58) Field of Classification Search
  CPC ........ B64C 2003/142; B64C 2003/143; B64C 15/14; B64D 27/02; B64D 27/24; B64D 33/02; B64D 33/04; B64D 2027/026; Y02T 50/60
  See application file for complete search history.

(56) References Cited

U.S. PATENT DOCUMENTS

| | | | | |
|---|---|---|---|---|
| 2,935,275 | A * | 5/1960 | Grayson | B64C 39/001 244/23 C |
| 2,937,492 | A | 5/1960 | Lehberger | |
| 3,243,146 | A * | 3/1966 | Clover | B64C 29/0025 244/23 C |
| 3,503,573 | A * | 3/1970 | Modesti | B64C 29/0066 244/12.2 |
| 3,514,053 | A * | 5/1970 | Mcguinness | B64C 39/001 244/12.2 |
| 3,519,224 | A * | 7/1970 | Boyd | B64C 29/0066 244/23 R |
| 3,632,065 | A * | 1/1972 | Rosta | B64C 27/20 244/17.11 |
| 3,933,325 | A | 1/1976 | Kaelin | |
| D238,938 | S * | 2/1976 | Moller | D12/325 |
| 4,824,048 | A * | 4/1989 | Kim | B64D 27/20 244/12.2 |
| D320,378 | S * | 10/1991 | Webster | D12/325 |
| D335,902 | S * | 5/1993 | Tsai | D21/451 |
| 5,351,911 | A | 10/1994 | Neumayr | |
| 9,096,314 | B2 | 8/2015 | Brotherton-Ratcliffe et al. | |
| D847,021 | S * | 4/2019 | Kim | D12/16.1 |
| 11,021,242 | B2 * | 6/2021 | Hayden, III | B64C 29/0016 |
| 2011/0168833 | A1 * | 7/2011 | Brothers | F02C 7/36 244/12.1 |
| 2016/0101852 | A1 * | 4/2016 | Jiang | B64C 27/20 244/23 A |
| 2016/0200415 | A1 * | 7/2016 | Cooper | B64C 39/001 244/17.15 |
| 2018/0037319 | A1 * | 2/2018 | Noroyan | B64D 27/24 |
| 2018/0222603 | A1 * | 8/2018 | Grigg | B64D 27/20 |
| 2018/0257775 | A1 * | 9/2018 | Baek | B64C 27/006 |
| 2019/0217951 | A1 * | 7/2019 | Willner | B64C 15/14 |

OTHER PUBLICATIONS

Zimmerman, C. H., "Aerodynamic Characteristics of Several Airfoils of Low Aspect Ratio," NACA TN 539, Aug. 1935.

Avro Canada VZ-9 Avrocar available on-line at https://en.wikipedia.org/wiki/Avro_Canada_VZ-9_Avrocar.

Imber, R. D. and Rogers, E. O., "Investigation of Circular Planform Wing with Tangential Fluid Ejection," AIAA Paper 96-0558, Jan. 1996.

* cited by examiner

RADIAL VIEW | CROSS SECTIONS

SECTION A-A

SECTION B-B

SECTION C-C

SECTION D-D

VERTICAL TAKE OFF AND LANDING AIRCRAFT

BACKGROUND

Field

Embodiments described herein relate to a vertical take-off and landing aircraft, specifically an electric or hybrid-electric aircraft with no exposed rotors and limited moving parts.

BRIEF SUMMARY

Accordingly, the present invention is directed to a vertical take-off and landing (VTOL) vehicle that obviates one or more of the problems due to limitations and disadvantages of the related art.

In accordance with the purpose(s) of this invention, as embodied and broadly described herein, this invention, in one aspect, relates to a vertical take-off and landing vehicle, comprising: an airframe having an upper surface, a side surface and a lower surface and a central vertical axis; a first plurality of axially oriented fans, each axially oriented fan in a channel extending from the upper surface to the lower surface of the airframe, the first plurality of axially oriented fans arranged in a circular pattern in an arc defined by a first radius r1 from the central vertical axis; a second plurality of axially oriented fans, each axially oriented fan in a channel extending from the upper surface to the lower surface of the airframe, the second plurality of axially oriented fans arranged in a circular pattern in an arc defined by a second radius r2 from the central vertical axis; a first intake channel extending from a front of the airframe to a rear of the airframe; a first laterally-oriented fan in the first intake channel; a first lateral channel extending from and in fluid communication with the first intake channel; a second intake channel extending from the front of the airframe to the rear of the airframe; a second laterally-oriented fan in the second intake channel; a second lateral channel extending from and in fluid communication with the second intake channel; and a third laterally-oriented fan in the first lateral channel and a fourth laterally-oriented fan in the second lateral channel.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the vertical take-off and landing (VTOL) vehicle, as well as the structure and operation of the various embodiments of the vertical take-off and landing (VTOL) vehicle, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a vertical take-off and landing (VTOL) vehicle. Together with the description, the figures further serve to explain the principles of the vertical take-off and landing (VTOL) vehicle described herein and thereby enable a person skilled in the pertinent art to make and use the vertical take-off and landing (VTOL) vehicle.

DETAILED DESCRIPTION OF THE EMBODIMENTS

Figure 1:
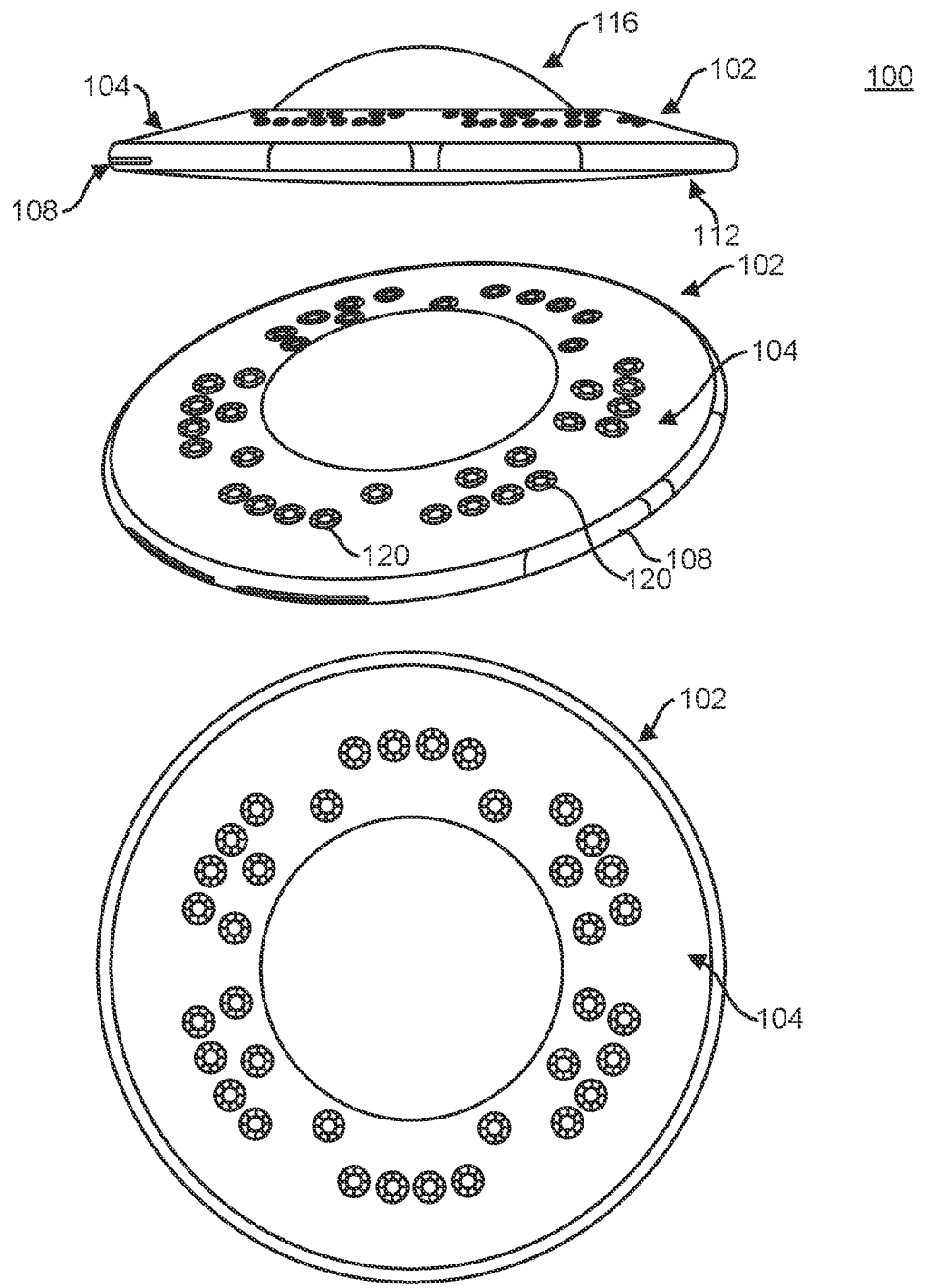
FIG. 1 is a combination view illustrating an embodiment of a vertical take-off and landing (VTOL) vehicle according to principles described herein.

Reference will now be made in detail to embodiments of the vertical take-off and landing (VTOL) vehicle with reference to the accompanying figures, in which like reference numerals indicate like elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains.

The present disclosure describes an aircraft that combines fundamental aerodynamic design principles, ducted electric fans, composite materials and electric or hybrid-electric power systems to provide vertical take-off and landing and high-speed flight capabilities in a relatively simple and compact configuration. The aircraft may be used to move goods and/or people via air in support of both military and civilian applications, such as on-demand air transportation for urban mobility.

One embodiment of the aircraft according to principles described herein is illustrated in FIG. 1.

As illustrated in FIG. 1, the aircraft 100 according to principles described herein includes an airframe 102 comprising an airframe, which may be a circular planform, having an upper surface 104, a side surface 108 and a lower surface 112. While described herein as a circular planform, the airframe need not be circular and is not so limited, a non-circular airframe can achieve vertical take-off, hover, transition to horizontal flight, cruise, transition back to hover and vertical landing according to principles described herein. For example, the planform may be nominally triangular blended wing or other high aspect ratio airframe as appropriate for purposes of the application. The upper surface 104 is designed to have predetermined positive camber whereas the lower surface could have either negative camber (concave up), zero camber (flat) or positive camber (concave down) provided the airframe 102 has net positive camber (upper surface curvature is always greater than the lower surface curvature). Overall, the combined camber should be positive. The greater the camber, the more lift can be achieved. But larger camber comes at the expense of more drag. It is anticipated that camber for lift and drag can be selected as design tradeoffs for specific applications of the VTOL. The maximum airframe camber could be more than 10 percent of chord length or the diameter. The circular planform airframe differs from conventional aircraft, either rotary or fixed wing, and provides the most compact aircraft 100 design. The negative lower surface camber improves airframe stability and increases internal height/volume. The built-in airframe camber provides high lift-to-drag ratio in a compact configuration, for example, at zero angle of attack, and thus wing-borne lift at zero angle of attack during horizontal flight and high internal height/volume for payload near the center of the aircraft. The airframe may include an aerodynamic canopy 116 for additional volume for passengers or payload. The canopy as illustrated is spherical, but may have a more aerodynamic design with lower drag, e.g. a half teardrop profile with its taper toward the rear of the canopy to reduce drag but maintain a generally circular cross section. If the planform is other than circular, an appropriate low drag canopy may be incorporated into the design.

The aircraft 100 further includes a plurality of fans 120, 121, all or some of which may be rigidly mounted. The fans 120, 121 may be ducted electric fans, as described herein, or other suitable distributed propulsion mechanisms. Most of the ducted electric fans 120 are mounted substantially vertically (axially) and others 121 are mounted substantially horizontally (laterally). The ducted electric fans 120, 121 thus may provide both vertical (axial) and horizontal (lateral) thrust to enable vertical take-off, hover, transition to horizontal flight, cruise, transition back to hover and vertical landing. In addition, the ducted electric fans 120, 121 provide attitude control during all phases of flight. In an embodiment of the aircraft described herein, none of the fans 120, 121 within the airframe 102 change their orientation during operation, i.e., they are rigidly mounted. Thus, the number of moving parts in the aircraft are minimized.

The aircraft 100 further includes a series of intakes 128 and exit nozzles 132, 142, 144 around its perimeter connected by a system of horizontal ducts/channels 124, 138 within the airframe 102, which enable the capture of ambient air, combination of some of the vertical airstreams with the horizontal ones, manipulation and subsequent distribution of internal mass flux to the desired exit nozzles. The magnitude and direction of the horizontal (lateral) thrust vectors is controlled by the power supplied to some of the vertical ducted fans 120, all of the horizontal fans 121 and several pairs of internal valves and actuator mechanisms that control the magnitude and direction of the internal flow. The horizontal thrust vectors, in turn, provide some aerodynamic lift caused by tangential blowing (Coanda effect), horizontal acceleration and deceleration of the aircraft, sustained cruise speed by overcoming aerodynamic drag as well as attitude control throughout flight. The magnitude and direction of the vertical (axial) thrust vectors, on the other hand, is controlled simply by the power supplied to the vertical ducted fans 120 individually. The vertical thrust vectors, in turn, provide the vertical lift required for take-off, hover and landing as well as some horizontal thrust, whose magnitude and direction depend on the angle of attack (as in the case of a helicopter in forward motion). When combined, the horizontal and vertical thrust vectors provide a complementary and somewhat redundant set forces and moments on the airframe, which enables vertical take-off, hover, transition to horizontal flight, high-speed cruise, transition back to hover, vertical landing as well as attitude control. As the aircraft 100 accelerates and generates more and more wing-borne lift, the power supplied to the vertical fans 120 is reduced to the minimum power required to maintain high-speed cruise at the desired altitude and a trim angle if necessary.

Figure 2A:
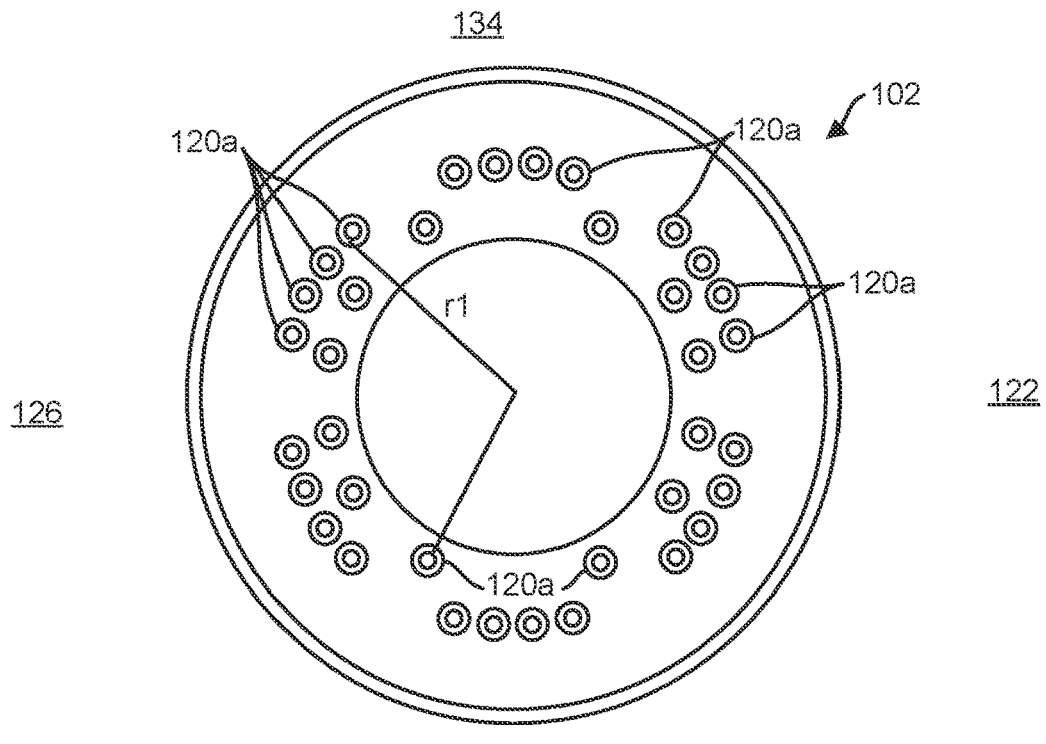
FIGS. 2a and 2b are top views illustrating an embodiment of a vertical take-off and landing (VTOL) vehicle according to principles described herein.
Figure 2B:
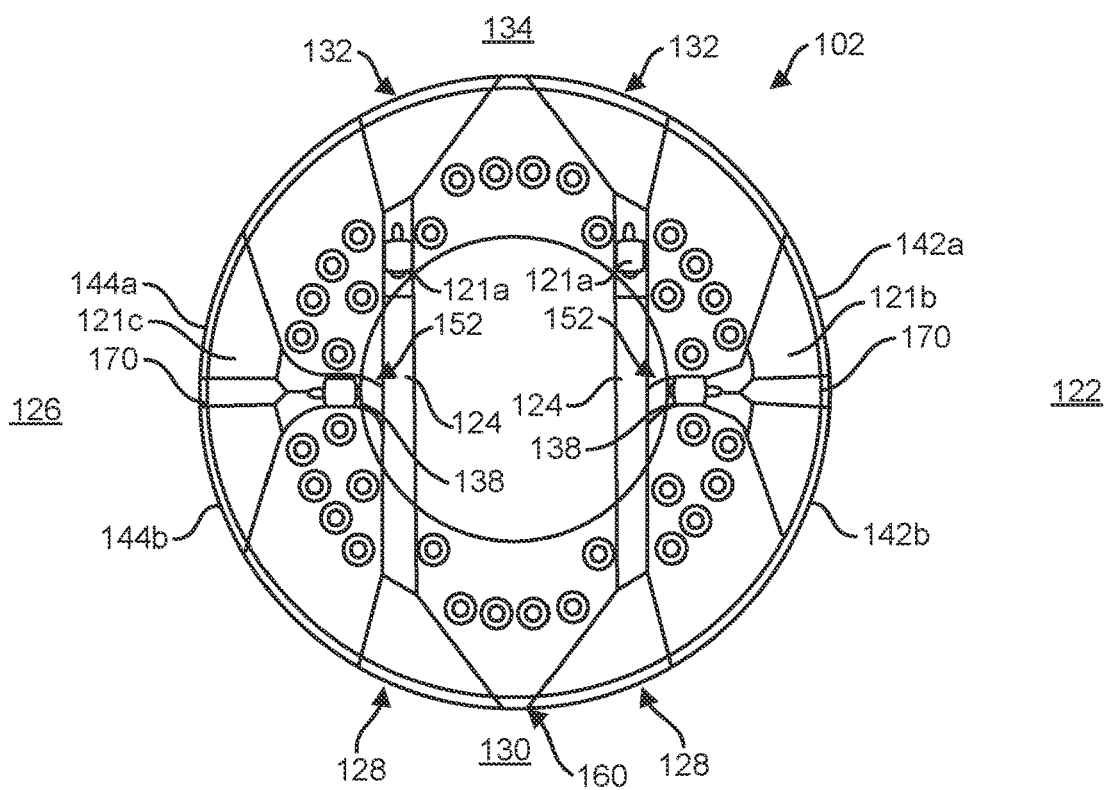

An embodiment of an aircraft according to principles described herein is illustrated in FIGS. 2(a) and 2(b). FIG. 2a, which is a top view of an embodiment of an aircraft according to principles described herein, illustrates a circular planform airframe 102 and a plurality of vertical fans 120 mounted therein. A first plurality 120a of vertically mounted fans 120 is arranged in a circular pattern in six sectors along circular arcs/segments defined by a first radius r1. A second plurality 120b of vertically mounted fans is arranged in a circular pattern in four sectors along circular arcs/segments defined by a second radius r2. In the presently described embodiment, there are 36 vertical fans, but an aircraft according to principles described herein is not so limited. For example, a vehicle designed for a heavier payload may employ more fans and a vehicle designed for lighter payload may employ fewer fans of the same size. Each vertical fan 120 has its own channel duct, with an inlet facing the upper surface of the airframe and an exhaust/outlet toward the lower surface of the airframe, such that air flows through the vertical fans 120 from the upper surface 104 to the lower surface 112 of the aircraft as is required to generate vertical lift.

FIG. 2b is a horizontal cross-sectional view of the airframe of FIG. 2a. As shown in FIG. 2b, the presently described embodiment includes two horizontally mounted fans 121a toward the rear 134 of the airframe and one 121b mounted to the left 122 and one 121c mounted to the right 126, which will be described in more detail below.

The fans 120, 121 themselves may be commercial off the shelf (COTS) products or may be custom designed and manufactured for a specific application. The COTS fans contemplated for the presently described embodiment may be the largest commercially available fans, which provide approximately 25 kg of thrust per fan, which may allow for an approximately 800 kg vehicle with a 200 kg (i.e., 2-person) payload. As can be appreciated by one of skill in the art, principles described herein can be applied to a larger or smaller vehicle, with the fans and internal ducts/channels being sized appropriately.

Figure 4A:
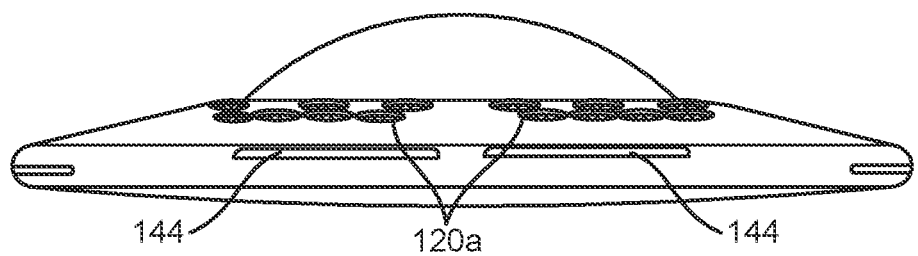
FIGS. 4a and 4b are right side views illustrating an embodiment of a vertical take-off and landing (VTOL) vehicle according to principles described herein
Figure 4B:
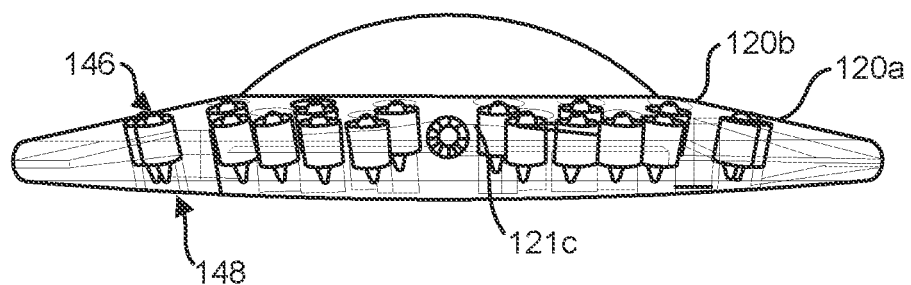

As can be seen in FIG. 4, which illustrates a side view of the presently described embodiment, the vertical fans 120 may be angled slightly such that the upper portion of the "vertical" fan is not truly vertical, but is mounted to be "normal" or "perpendicular" to the upper surface 104 of the circular planform airframe 102.

Referring again to FIG. 2b, the airframe 102 includes an internal ducting system to move air through the horizontal fans 121 to control the aircraft 100 acceleration and the airframe 102 attitude during flight. As can be seen in FIG. 2b, roughly parallel horizontal ducts or channels 124 extend from air intake ports 128 at the front 130 of the circular planform airframe 102 to exhaust ports 132 at the rear 134 of the airframe 102. A horizontal fan 121a is mounted in each of the horizontal air ducts 124 to the rear of a center line of the airframe 102. At approximately the halfway point of the length of each of the horizontal ducts 124, a lateral duct 138 extends from the horizontal duct 124 to an exhaust 142, 144 at the left 122 and the right 126 of the airframe 102, respectively. A horizontally mounted fan 121b, 121c is mounted in each of the lateral ducts 138. The exhaust 142, 144 to the left 122 and the right 126 of the airframe 102 may be split into two exit channels 142a, 142b, 144a, and 144b, such that the exit channels 142a, 142b, 144a, 144b at each lateral exhaust 142, 144 are fluidically separated by a structure, such as at least one wall, a bulkhead or the like 170. The split of these exhaust channels 142, 144 and/or 132 may create tangential blowing to generate a Coanda effect and also to induce flow on the upper surface 104 of the aircraft to increase lift of the vehicle without having to increase thrust from vertical fans. Each of the horizontal ducts 124 may include a deflector 152 to assist deflection of air into the lateral air ducts 138. In an aspect of the present principles, the deflector 152 may be moveable to allow for varying amounts of air to be diverted from the horizontal ducts 124 into the lateral ducts 138.

The cross-section of each of the ducts (lateral or horizontal) is designed to maintain nearly constant momentum flux throughout the ducts/channels. The goal is to minimize disruption and separation in flow so that losses are minimized. The cross-sectional area of the ducts/channels as a function of position is designed to maintain maximum momentum flux while accommodating the mass flow rate that can be handled efficiently by all the fans that are connected to that duct/channel. The cross-sectional area is more critical than the specific shape of the cross-section as the former controls momentum flux whereas the latter determines frictional losses that represent a second-order effect. For example, the intake may be a more rectangular slit-like inlet along a front edge of the aircraft. The duct may then transition into a more rectangular or circular cross section, while substantially maintaining the appropriate cross-sectional area. The horizontal duct 124 may be sized such that the rear horizontal fan 121a mounted therein does not completely fill the cross-sectional area of the duct 124 so that some air may flow around, under or over the fan 121a.

For vertical take-off of an aircraft according to principles described herein all vertical fans 120 and the left and right horizontal fans 121b, 121c are turned on. As can be seen in FIGS. 2 and 3, in one embodiment, the intakes/inlets 128 may be located at the front 130 of the aircraft. Air is captured through the intakes/inlets 128 located on the perimeter (front wall) of the aircraft. The inlets 128 are sized to the anticipated velocity (e.g., maximum operating speed or optimized cruise speed) of the aircraft such that the intakes 128 do not take in more air than can be accommodated through an internal ducting system (e.g., horizontal ducts 124 and lateral ducts 138) and the horizontal fans 121. Air is manipulated in the horizontal air channel 124 to the left and right fans 121b, 121c through the lateral channels 138 and their associated outputs or exit nozzles to control the attitude of the aircraft during vertical take-off. During horizontal flight, air not diverted to the lateral channels 138 may pass through the horizontal ducts 124 to the rear horizontal fans 121a and to exhaust/outlets 132 at the rear 134 of the aircraft 100. The horizontal ducts 124 in an area where the rear horizontal fans 121a are located may be sized to allow airflow around the horizontal fans 121a to provide for efficient operation of the horizontal fans 121a at cruise speed.

Figure 3A:
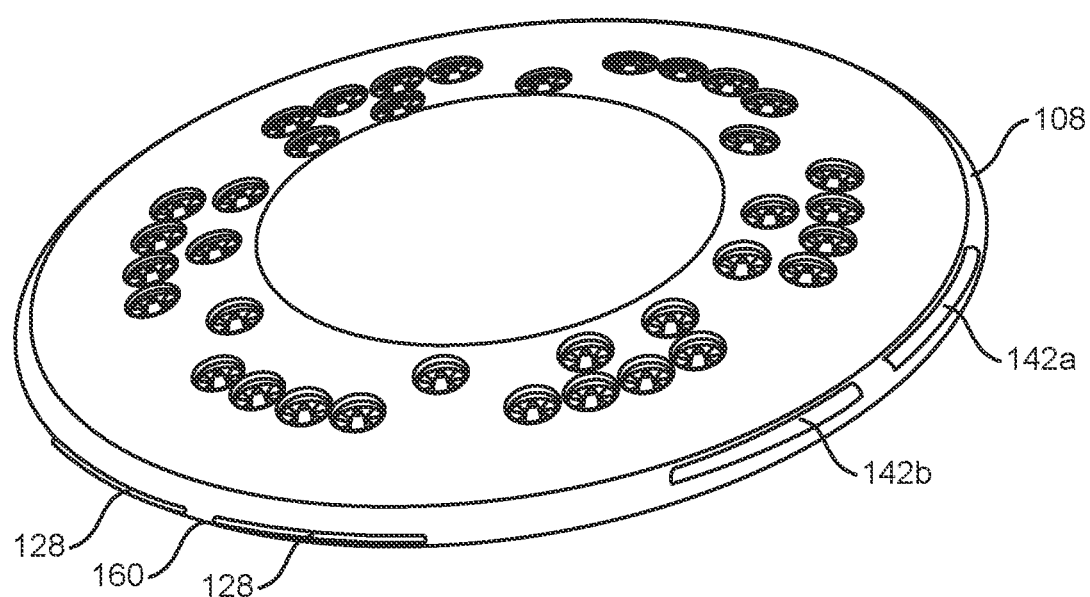
FIGS. 3a and 3b are isometric views illustrating an embodiment of a vertical take-off and landing (VTOL) vehicle according to principles described herein.
Figure 3B:
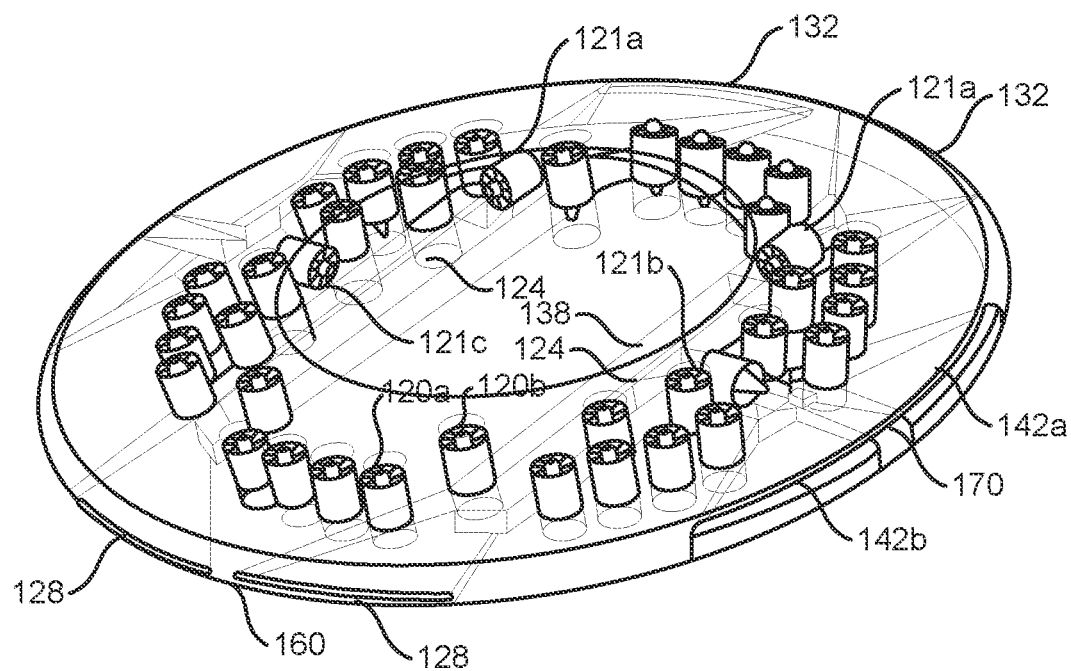
Figure 3C:
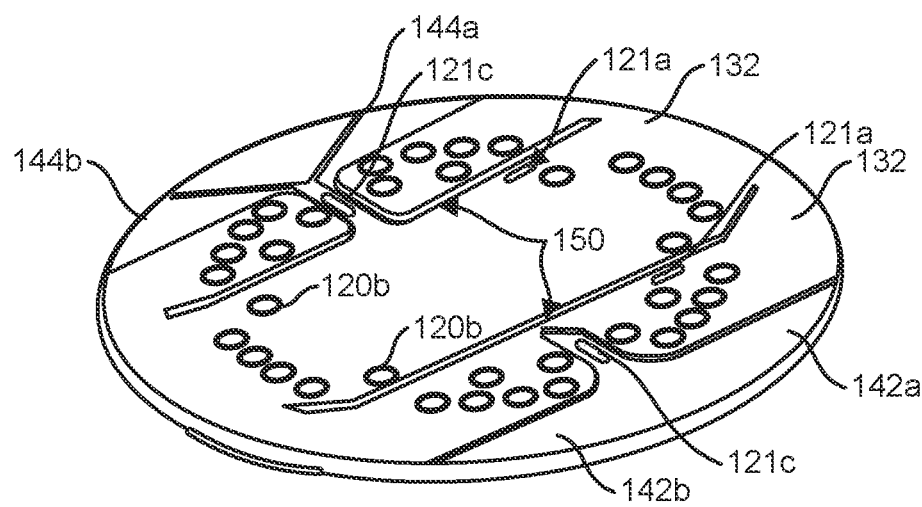
FIGS. 3c, 3d, 3e, 3f, 3g and 3h are cross-sectional views illustrating various ducts in a vertical take-off and landing (VTOL) vehicle according to principles described herein.
Figure 3D:
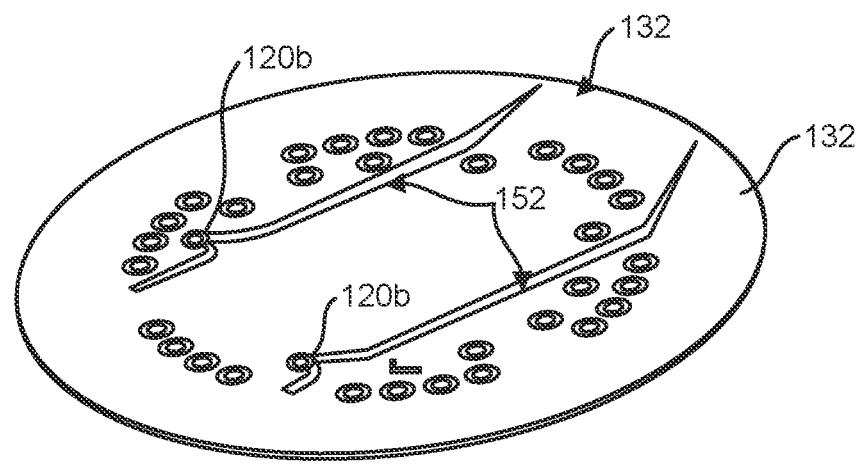
Figure 3E:
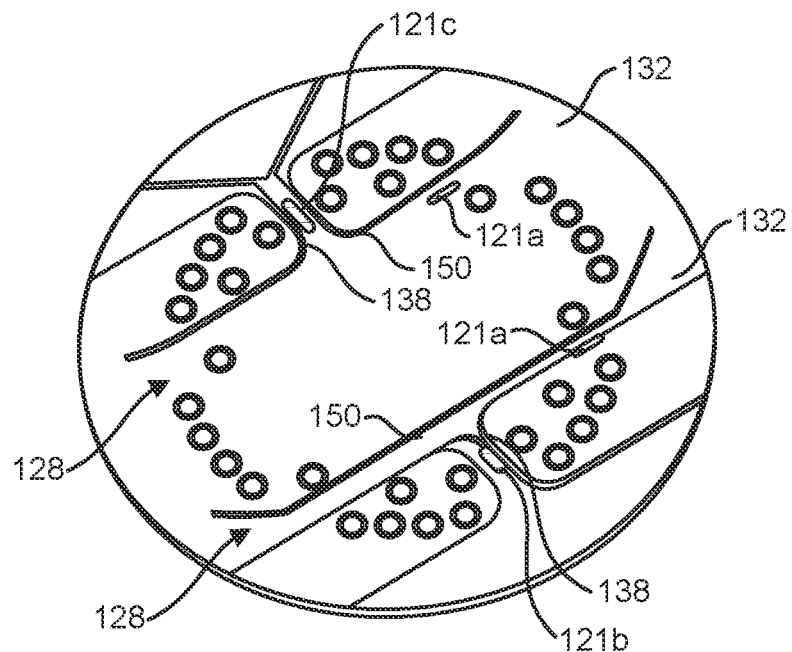
Figure 3F:
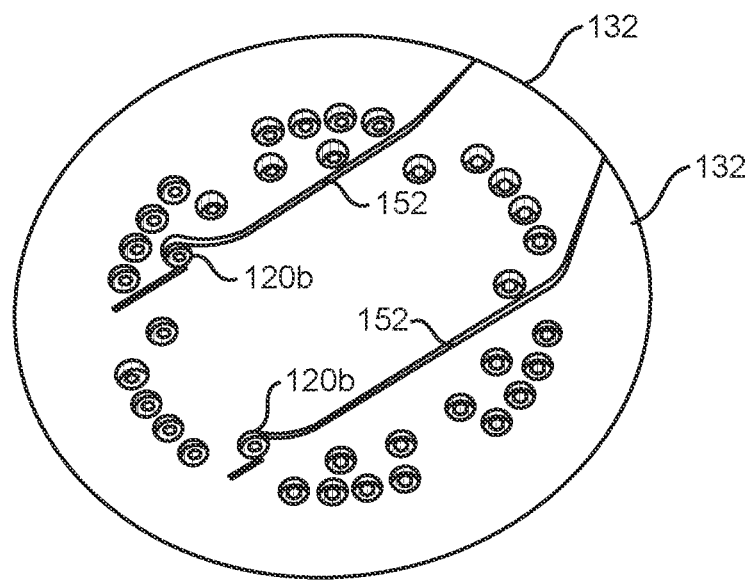
Figure 3G:
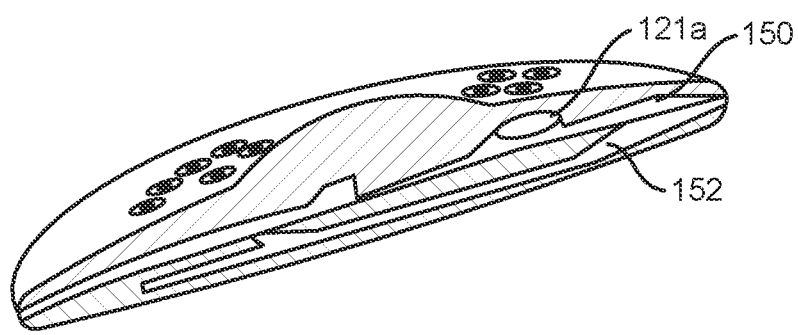
Figure 3H:
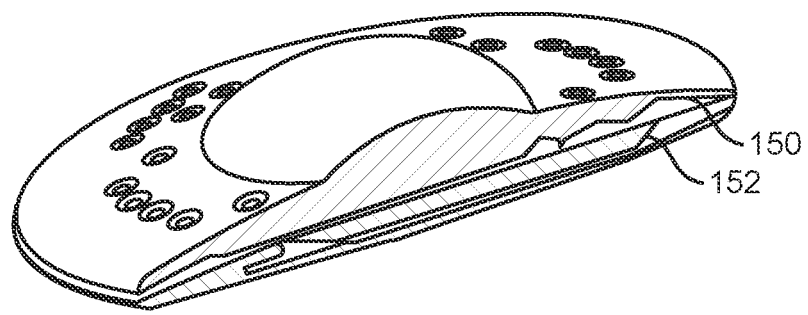

FIGS. 3c and 3d are horizontal cross-sections of an embodiment of the circular planform at two different elevations from a first perspective illustrating upper and lower horizontal channels and ducts according to principles described herein. FIGS. 3e and 3f are horizontal cross-sections of an embodiment of the circular planform at two different elevations from a second perspective illustrating upper and lower horizontal channels and ducts according to principles described herein. FIGS. 3g and 3h are vertical cross-sections along horizontal ducts/channels to illustrate the horizontal ducts channels.

As shown in FIGS. 3g and 3h, each front to back horizontal duct may include an upper channel 150 and a lower channel 152. As can be seen in FIG. 3g, the horizontal fan 121a is provided in the upper channel 150. Upper channel 150 is in fluid communication with intake 128 and lower channel 152, which does not have direct connection with intake 128. Both upper channel 150 and lower channel 152 directly connect with exhaust port 132. As can be seen in FIG. 3c, which is a cross section of the aircraft through the upper channel, lateral/horizontal channel 138 extends from the upper channel 150 to exhaust 142 or 144. As can be seen in FIG. 3d, lower channel 152 may be in fluid communication with one or more of the vertical fans 120b on the inner radius r1. This architecture enables controllable deflection of vertical flow from some of the vertical fans 120b into the horizontal channels/ducts during transition from vertical to horizontal flight and during cruise.

In addition, the aircraft may include an elevated articulating tail (not shown) for a higher lift to drag ratio than the aircraft without the tail and also for static stability. It is intended that the tail profile remain within the planform of the aircraft and will only add vertical height to the aircraft, not horizontal length or width. The tail is elevated such that the air flow around it is independent of the air flow around the aircraft itself, allowing it to efficiently generate additional aerodynamic lift and moment and move the center of pressure downstream of the center of gravity of the aircraft. The addition of an elevated articulating tail may provide a statically stable airframe with better control of the aircraft trim angle and also higher lift to drag ratio. The tail may assist in maintaining the aircraft horizontal with respect to the ground by pitching the tail rather than the entire aircraft to provide sufficient lift. The tail may be located toward the rear of the planform on an arc toward the rear edge of the aircraft. The leading and trailing edges of the tail may be straight or curve with the arc of the circular planform. It should be appreciated that if the planform is not circular, and appropriate tail may be provided to conform within the non-circular planform according to principles described herein.

During vertical take-off, the aircraft 100 starts its initial climb at zero angle of attack. At some altitude, the nose 160 of the aircraft 100 may be pitched downward such that the thrust provided by the vertical fans 120 has a horizontal component to aid in the forward acceleration of the aircraft 100.

During vertical take-off, the aircraft 100 ascends and controls its attitude using vertical fans 120 and left and right horizontal fans 121b, 121c. At some altitude, the horizontal fans 121a are turned on to provide the primary horizontal thrust and thus the forward acceleration of the aircraft 100.

The airframe 102 according to principles described herein is designed to generate lift during horizontal flight. As the aircraft 100 reaches the desired cruise altitude and trim angle and achieves sufficiently high horizontal speed to generate the required lift, thrust provided by the vertical fans 120 can be reduced or completely turned off. In one aspect, all fans 120a in an outer "ring" of fans (e.g., at radius r1 from the center of the aircraft) and some fans 120b at the inner "ring" of fans (e.g., at radius r2 from the center of the aircraft) can be turned off and their ducts closed, while the rest of the fans 120b at the inner "ring" of fans (e.g., at radius r2 from the center of the aircraft) may remain on. Airflow through any of the fans 120, 121 can be controlled by controlling electrical current to the fans. Airflow through ducts/channels can be controlled by controlling the current to those fans 120, 121 that are either connected to or within those horizontal ducts/channels and by controlling the respective internal flow valves and actuators.

Figure 5A:
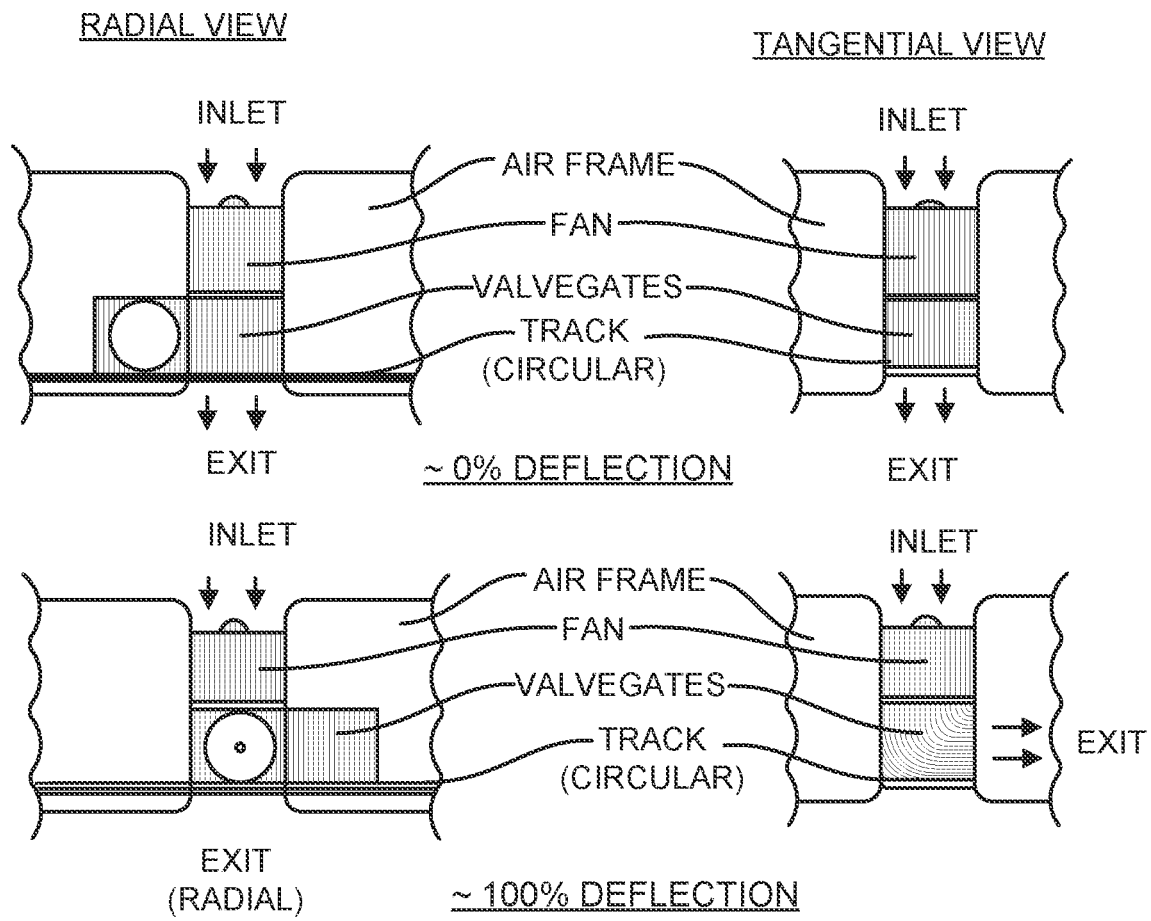
FIGS. 5a, 5b and 5c illustrate internal flow deflector mechanisms for diverting flow within the VTOL.

An exemplary structure of the internal flow control valve gate for vertical to horizontal deflection of thrust vectors is shown in FIG. 5a. The internal flow control system includes two independently controlled valve gate structures (i.e., one each on the left-hand and right-hand sides of the aircraft) that can be moved along a circular track just below the vertical fans 120b. Each independently controlled valve gate structure includes two modules (i.e., one module for each fan). Each module incorporates an "open" and an "elbow" section of a duct as illustrated in FIG. 5a. As the valve gate structure is moved along the circular track and the open sections of the modules are placed under the vertical fans 120b, the airflow from the fans passes through the valve gate structure without interference and generates vertical thrust. When the elbow sections of the modules are placed under the vertical fans 120b, the airflow from the fans is diverted into the adjacent horizontal duct/channel 124 and is used to generate horizontal thrust, augmenting the thrust generated by the horizontal fans 121a toward the rear 134 of the aircraft. Depending on the angular position of the valve gate structure, all, some, or none of the air from the vertical fans 120b is deflected into the horizontal ducts/channels 124.

Alternatively, four or more independently controlled horizontal fans could be incorporated within the airframe (i.e., a total of six fans) to provide sufficient horizontal thrust for transition from vertical to horizontal flight and for subsequent cruise flight. This approach could eliminate the need for this internal flow control system and its moving parts and would therefore be a design trade.

Figure 5B:
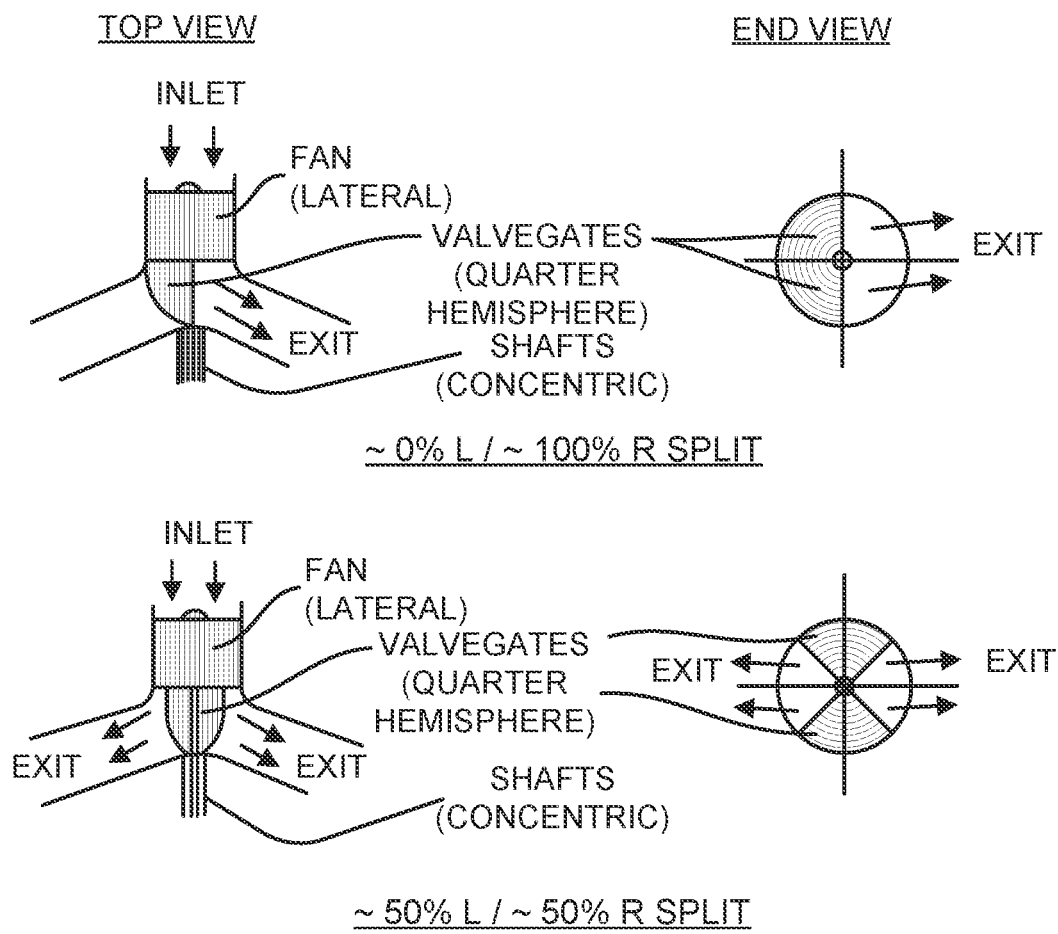

An exemplary structure of the internal flow control valve gate for attitude control is shown in FIG. 5b. The internal flow control system includes two valve gate structures (one each for the left and right horizontal fan 121b, 121c). Each valve gate structure includes two independently controlled one-quarter hemisphere sections that can be rotated about the axis of the horizontal fans as illustrated in FIG. 5b. As the one-quarter hemisphere sections are rotated about the axis of the horizontal fans, the airflow from the fans is split between the two exit nozzles (i.e., 142a and 142b or 144a and 144b) in different proportions enabling control of the magnitude of thrust from each nozzle. Depending on the angular position of the one-quarter hemisphere sections, all, some, or none of the air from each horizontal fan 121b, 121c can be deflected into the desired exit nozzle 142a, 142b, 144a, 144b, enabling attitude (i.e., pitch, yaw, and roll) control.

Alternatively, two or more independently controlled horizontal or lateral fans could be incorporated within the airframe (i.e., a total of four fans) to provide dedicated lateral thrust from each of the four exit ports/nozzles 142a, 142b, 144a, 144b for attitude control. This approach could eliminate the need for this internal flow control system and its moving parts and would therefore be a design trade.

Figure 5C:
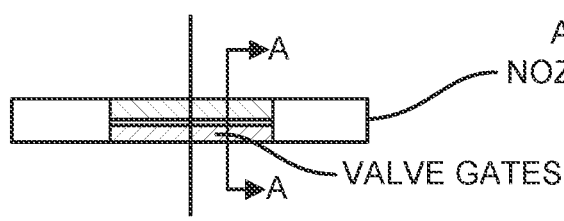
Figure 5C:
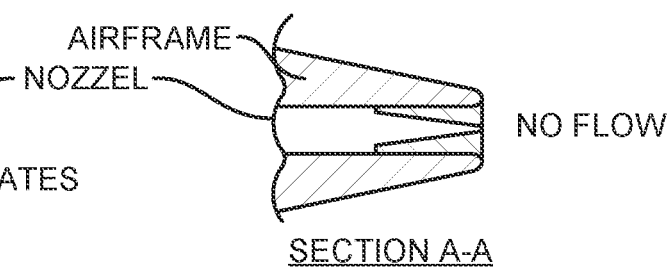
Figure 5C:
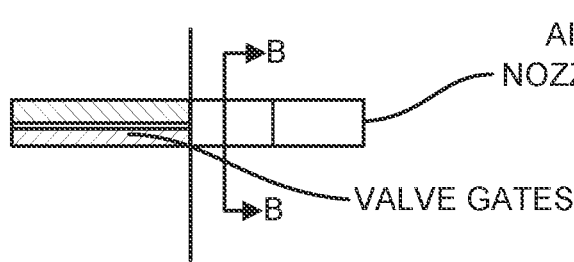
Figure 5C:
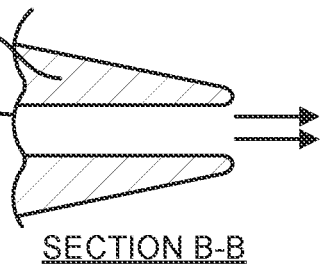
Figure 5C:
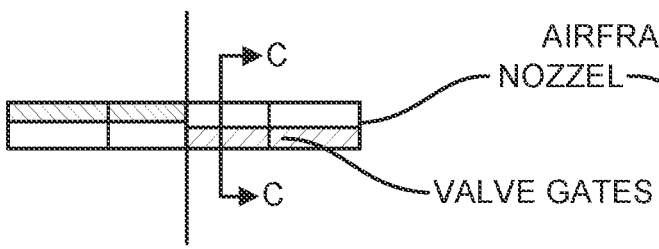
Figure 5C:
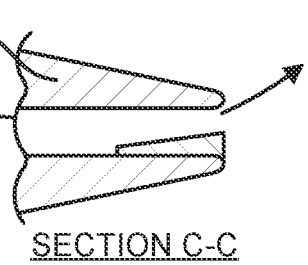
Figure 5C:
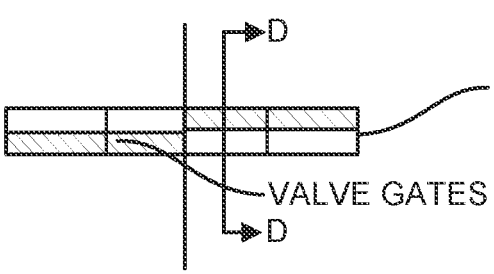
Figure 5C:
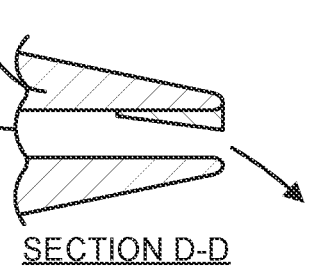

An exemplary structure of the internal flow control valve gate for yaw and some roll control is shown in FIG. 5c. The internal flow control system includes two independently controlled valve gates located within a single exit nozzle, which is formed by merging the two horizontal ducts/channels. The valve gates (one each in the upper and lower half of the rectangular cross-section nozzle) can be moved along a circular arc from one side of the nozzle to the other to block and/or deflect the flow in that part of the nozzle. When the upper and lower valve gates are at the same angular position (i.e., when they overlap), they block that part of the nozzle and split the flow between the unblocked parts on either side of the valve gates. This enables control of relative magnitudes of left and right thrust vectors and thus yaw control. When the upper and lower valve gates are at different angular positions (i.e., when they partially overlap or don't overlap), they deflect the flow downward and upward, respectively. This enables control of relative deflection of left and right thrust vectors and thus some roll control.

Alternatively, the same six independently controlled horizontal fans, discussed in the above, could be used to not only enable transition from vertical to horizontal flight and sustain cruise flight, but also provide redundant attitude control. This approach could eliminate the need for this internal flow control system and its moving parts and would therefore be a design trade.

Referring to the exemplary embodiment of FIGS. 5a-5c, there are three components for the internal flow control illustrated: The first component is a diverter that deflects flow from vertical ducts into horizontal channels; there are two diverters in the exemplary embodiment; they are located under the inner ring of vertical fans at radius r1 and are independently controlled; an example valve gate structure is shown in (FIG. 5a). This mechanism thus has a total of two moving parts. The second component is a splitter that controls the amount of flow from each of the side exit ports/nozzles; there are two splitters in the exemplary embodiment; each is located behind the left/right horizontal fans and has two independently actuated components to control the amount of flow into and out of each of the side exit ports/nozzles; manages the internal flow that comes out of the forward and rearward exit ports; an example valve gate structure is shown in FIG. 5b. This mechanism thus has a total of four moving parts. The third component is the splitter/diverter that controls the relative magnitude and direction of the left and right thrust vectors in the rear; there are two of these; they are located within one exit nozzle that is formed by merging the horizontal ducts/channels downstream of the two horizontal fans in the rear; manages the relative magnitude and vertical inclination of the left and right thrust vectors; an example valve gate structure is shown in FIG. 5c. This mechanism has a total of two moving parts.

Some or all of the vertical channels housing the vertical fans 120 may further include spring-loaded louvered doors to close the unused vertical ducts and thus reduce or eliminate additional drag that would be caused by air flowing through the vertical channels during horizontal flight. During horizontal flight, there will be lower pressure on the upper surface of the aircraft ad higher pressure on the lower surfaces. The louvered doors may be spring-biased such that they close and remain closed while the fans are not in operation and open only when the fans are running. For vertical channels where the fans are still in operation, there may be no doors, or the resulting air flow will overcome the spring's bias.

In another aspect, the vertical fans may be run at just enough speed to generate just enough suction to eliminate through flow when lift from the vertical fans is not required. In other words, a "stagnant" pocket of air can be maintained within vertical ducts by running the vertical fans at very low speeds. The required speed and thus current would be different for each vertical fan and in situ static pressure measurements would need to be used to control the current to each fan.

In an aspect of the presently described take-off, although not required, the aircraft 100 may climb, without any forward motion, to an altitude that is higher than an intended cruise altitude. The aircraft 100 could then be pitched nose down to a negative angle of attack to then accelerate to its cruise speed using the horizontal/forward components of its axial and lateral thrust vectors as well as the gravity vector as it descends to its intended cruise altitude, thereby taking advantage of gravity to assist acceleration (i.e., converting its potential energy into kinetic energy). As the aircraft 100 accelerates, it is also pitched nose up to the required trim angle of attack at the intended cruise speed and cruise altitude.

The aircraft 100 described herein is designed to generate sufficient aerodynamic lift at the intended cruise speed, cruise altitude and trim angle of attack (preferably zero) such that the fans need only generate enough thrust to overcome the drag and control the attitude of the aircraft 100. This approach would require only a small number of fans to operate during cruise thereby minimizing power consumption and maximizing time of flight and thus range for a given amount of stored energy or battery capacity.

For landing, the aircraft 100 will have inherent kinetic energy, which must be managed. During transition back to hover and vertical landing, the aircraft nose 160 is pitched up to a higher angle of attack as the horizontal thrust is reduced, creating increased aerodynamic drag to help decelerate the aircraft 100 to slower speeds. The aircraft nose 160 may be pitched up using horizontal fans 121 and/or vertical fans 120 for attitude control. At positive angles of attack, the vertical fans 120 generate both lift and drag components of thrust on the airframe. The lift component compensates for the loss of aerodynamic lift and helps maintain altitude as the aircraft 100 slows down. The drag component augments the aerodynamic drag and helps decelerate the aircraft 100 more rapidly. As the aircraft transitions to hover, the magnitude of thrust from the vertical fans 120 is increased and the angle of attack is decreased until the forward motion is stopped and the aircraft 100 begins its vertical descend and landing.

As the aircraft 100 slows down, more vertical thrust must be generated by the vertical fans 120 to compensate for the loss of aerodynamic lift owing to a slower horizontal speed. The pitch of the aircraft 100 is reduced to zero as the aircraft 100 transitions back to hover. The rate at which the pitch is reduced to zero is dependent on the rate at which the aircraft 100 slows down to zero horizontal speed. Once the horizontal motion of the aircraft 100 is arrested and the pitch is reduced to zero, the power/current supplied to the vertical fans 120 is reduced to enable vertical descent and landing of the aircraft 100. Depending on the total mass of the aircraft either some or all of the fans 120, 121 will be active, albeit at different and varying power levels, during vertical landing.

It is contemplated that landing can be on any level surface, including at "vertiports" in an urban mobility infrastructure. To assist in passenger or payload loading and unloading, the aircraft may include deployable landing "posts" not shown). The landing post height could be sized to allow for enough clearance for people, e.g., passengers or payload loading personnel, to move under the aircraft 100. Alternatively, the landing posts on the aircraft 100 could be shorter, while the vertiport could have a complementary set of landing platforms on which the aircraft 100 could land that would allow sufficient clearance under the aircraft 100 for access to the passenger compartment, the payload bay or other areas of the aircraft.

The aircraft 100 could further include deployable stairs for access to the passenger compartment, the payload bay or other areas of the aircraft. Alternatively, the vertiport could provide a set of stairs that could be brought to the aircraft for access to the passenger compartment, the payload bay or other areas of the aircraft.

The aircraft may include a canopy 116, for example, for use in passenger transport. While a hemispherical as illustrated in the figures provided here, the canopy is not so limited and may be modified to improve lift and reduce drag. The canopy of the aircraft could open in any appropriate direction. For example, the canopy could slide open, lift open in a wing configuration, or be hinged to open partially or completely to allow access to and from the top of the aircraft 100.

The power supply in the aircraft may be all electric (battery pack) or may be hybrid electric (i.e., fuel cell plus battery pack or gasoline engine plus generator plus battery pack), depending on the aircraft 100 mission (i.e., payload mass, cruise speed, flight range, hover time, flight time) and the specific power consumption of the fans. For example, in a civilian application such as for the transport of one or more people or packages, the use of COTS fans may be supported by an electric power supply (i.e., rechargeable batteries). For military applications, for example, the longer distance or flight times or heavier payload requirements cannot be supported by currently available battery power and energy densities. Therefore, a hybrid electric power supply may be required for those cases. An advantage of the hybrid electric design is that higher energy fuels may be used to achieve longer flight times and distances. All energy storage systems, (i.e., batteries in all electric versions and fuel cells or tanks in hybrid electric versions) will be within the aircraft 100.

It should be noted that as the battery technology advances, even the longer distance or time of flight and/or heavier payload applications may be supported by an all-electric power system, taking into consideration non-electrical redundancies that might be needed for certain applications. For all electric designs, rechargers (e.g., rapid rechargers) can be provided at vertiports or other landing sites.

The aircraft 100 according to principles described herein, is designed to have two or more power supply systems for redundancy and safety. One power supply to provide the power required by the vertical fans 120 and a separate power supply to provide the power required by the horizontal fans 121, internal flow control systems (valves and actuators) as well as the other auxiliary and safety subsystems. Two or more power supplies provide redundancy and safety and allow for the operation of the aircraft even when there is a failure.

For example, one power supply can supply power to the internal flow control system (internal valves, flow deflectors, and actuators) and the horizontal fans 121. In this configuration, if power is lost to most fans during flight, the control of the aircraft 100 would still be possible and that would allow for a controlled glide and descent. Air that is passively captured by the inlet can still be manipulated to maintain attitude control and enable a controlled descent and low-impact landing. As an added safety measure, one or more ballistic parachutes may be deployed to help decelerate and safely land the aircraft 100 in the event of multiple system failures. As a last resort, in a passenger vehicle, a passenger cabin can be designed to separate from the airframe and parachute down safely.

In the aircraft 100 described herein, airflow from the vertical fans 124 is diverted to the horizontal ducts/channels 124 to assist in propulsion and/or attitude control. As can be seen in FIG. 2, vertical fans 120 are placed at two different radii r1, r2 from the center of the airframe. Some of the vertical fans 120b along the circular arc formed by the smaller of the two radii are located adjacent to horizontal ducts/channels 124 such that the airflow from these vertical fans 120b can be recruited for horizontal thrust using a set of internal valves and actuators to divert flow from the vertical fan duct into the horizontal duct/channel 124. The internal flow control mechanism described herein eliminates the need for tilting fans and enables the relatively simple aircraft 100 design described herein. Further, the internal flow control mechanism enables a reliable and safe method of transition from vertical to horizontal flight.

Additional lift for the aircraft may be provided by the Coanda effect caused by suction over the upper surface 104 and by tangential blowing around the perimeter. The airframe 102 itself may be constructed from composite and other high-strength lightweight materials. Circular planform design enables high structural strength and high stiffness with lightweight materials.

The aircraft described herein has inherent noise reduction and mitigation capability that can be achieved by locating the horizontal thrust vectors near the perimeter but above the aircraft 100 thereby controlling the direction of sound travel away from the ground or population centers. This also has the added benefit of tangential blowing and augmentation of lift through the Coanda effect. The aircraft further provides air transport capability for people and goods with high reliability owing to its relatively simple design with few moving parts and built-in redundancies, and at relatively low cost because of its lower cost of ownership and operation owing again to its relatively simple design with few moving parts and minimal infrastructure requirements. For example, the presently described embodiment may have as few as eight moving parts for internal flow control (valves and actuators), not including the rotating fan blades.

In the present embodiment of the vertical take-off and landing (VTOL) aircraft, the upper level and lower level ducts in the first and second intake channels enable upper surface blowing (USB) and lower surface blowing (LSB), respectively for circulation control via the Coanda effect. USB increases circulation and thus augments vertical lift during all phases of flight (i.e., vertical take-off, hover, transition to horizontal flight, high-speed cruise, transition back to hover and vertical landing), whereas LSB decreases circulation and thus reduces vertical lift. Furthermore, both USB and LSB alter the surface pressure distribution around the airframe, USB creates a stabilizing longitudinal moment about the center-of-gravity, whereas LSB creates a destabilizing longitudinal moment about the center-of-gravity. Therefore, combined use of USB and LSB can not only increase lift without increasing the airframe angle-of-attack, thereby enabling high-speed cruise flight at or near minimum drag condition, but can also stabilize the statically unstable airframe without the use of conventional aerodynamic stabilizers (e.g., a horizontal tail). The magnitude of USB will always be greater than that of LSB. The difference between the magnitudes of USB and LSB circulation can be used to control the relative increase in vertical lift, whereas the vector sum of USB and LSB thrust vectors can be used to control the magnitude of horizontal thrust or acceleration and thereby enable stable flight across a wide range of cruise speeds.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A vertical take-off and landing vehicle, comprising:
   an airframe having an upper surface, a side surface and a lower surface and a central vertical axis;
   a first plurality of axially oriented fans, each axially oriented fan in a channel extending from the upper surface to the lower surface of the airframe, the first plurality of axially oriented fans arranged in a circular pattern in an arc defined by a first radius r1 from the central vertical axis;
   a second plurality of axially oriented fans, each axially oriented fan in a channel extending from the upper surface to the lower surface of the airframe, the second plurality of axially oriented fans arranged in a circular pattern in an arc defined by a second radius r2 from the central vertical axis;
   a first intake channel extending from a front of the airframe to a rear of the airframe;
   a first laterally-oriented fan in the first intake channel;
   a first lateral channel extending from and in fluid communication with the first intake channel;
   a second intake channel extending from the front of the airframe to the rear of the airframe;
   a second laterally-oriented fan in the second intake channel;
   a second lateral channel extending from and in fluid communication with the second intake channel;
   a third laterally-oriented fan in the first lateral channel and a fourth laterally-oriented fan in the second lateral channel; and
   wherein the first lateral channel comprises two exit channels and the second lateral channel comprises two exit channels, wherein each of the exit channels comprises an exit channel exhaust port in the side surface of the airframe.

2. The vertical take-off and landing vehicle of claim 1, wherein the first intake channel and the second intake channel are parallel.

3. The vertical take-off and landing vehicle of claim 1, wherein the first and second lateral channels extend respectively from the first intake channel and the second intake channel at a halfway point between the front of the airframe and the rear of the airframe.

4. The vertical take-off and landing vehicle of claim 1, the first and second lateral channels extend in opposite directions.

5. The vertical take-off and landing vehicle of claim 1, wherein each of the exit channel exhaust ports is configured to provide tangential blowing to induce air flow on the upper surface to generate a Coanda effect.

6. The vertical take-off and landing vehicle of claim 1, wherein the first plurality of axially oriented fans and the second plurality of axially oriented fans are arranged at right angles to the upper surface of the airframe.

7. The vertical take-off and landing vehicle of claim 1, further comprising a first deflector to divert air from the first intake channel into the first lateral channel and a second deflector to divert air from the second intake channel into the second lateral channel.

8. The vertical take-off and landing vehicle of claim 1, wherein the airframe has a circular footprint.

9. The vertical take-off and landing vehicle of claim 1, wherein the airframe has a net positive camber.

10. The vertical take-off and landing vehicle of claim 1, wherein the upper surface has a predetermined positive camber.

11. The vertical take-off and landing vehicle of claim 1, wherein the lower surface has a predetermined negative camber, zero camber or positive camber.

12. The vertical take-off and landing vehicle claim 1, wherein the first intake channel comprises an upper level duct and a lower lever duct; and the second intake channel comprises an upper level duct and a lower level duct.

13. The vertical take-off and landing vehicle of claim 12, wherein the upper level ducts and the lower level ducts do not share airflow.

14. The vertical take-off and landing vehicle of claim 12, wherein airflow in the upper level ducts flows from two or more of the axially oriented fans.

15. The vertical take-off and landing vehicle of claim 12, wherein one axially oriented fan provides airflow to the lower level duct of the first intake channel and one axially oriented fans provides airflow to the lower level duct of the second intake channel.

16. The vertical take-off and landing vehicle of claim 12, wherein the upper level ducts are used for upper surface blowing (USB) and lower level ducts for lower surface blowing (LSB) to control the circulation around the airframe and horizontal thrust on the airframe.

17. The vertical take-off and landing vehicle of claim 12, wherein the difference between the magnitudes of USB and LSB thrust vectors is used to increase lift and control longitudinal stability.

18. The vertical take-off and landing vehicle of claim 12, wherein the vector sum of USB and LSB thrust vectors is used to control the magnitude of horizontal thrust across a wide range of cruise speeds.

19. A method of operating a vehicle, the vehicle including an airframe having an upper surface, a side surface and a lower surface and a central vertical axis; a first plurality of axially oriented fans, each axially oriented fan in a channel extending from the upper surface to the lower surface of the airframe, the first plurality of axially oriented fans arranged in a circular pattern in an arc defined by a first radius r1 from the central vertical axis; a second plurality of axially oriented fans, each axially oriented fan in a channel extending from the upper surface to the lower surface of the airframe, the second plurality of axially oriented fans arranged in a circular pattern in an arc defined by a second radius r2 from the central vertical axis; a first intake channel extending from a front of the airframe to a rear of the airframe; a first laterally-oriented fan in the first intake channel; a first lateral channel extending from and in fluid communication with the first intake channel; a second intake channel extending from the front of the airframe to the rear of the airframe; a second laterally-oriented fan in the second intake channel; a second lateral channel extending from and in fluid communication with the second intake channel, the method comprising:
turning on the first plurality of axially oriented fans, the second plurality of axially oriented fans, the first laterally oriented fan and the second laterally oriented fan;
capturing air through the first and second intake channels;
channeling air from at least one of the first and second intake channels to a respective one of the first and second laterally oriented fans through a respective one of the first and second lateral channels or to a respective exit channel or exhaust port.

20. A method of operating a vehicle according to claim 19, comprising:
diverting and controlling flow of air from at least one of the axially oriented fans into one of the lateral channels, the amount of flow of air allowing the vehicle to transition from vertical take off to horizontal flight.

21. A method of operating a vehicle according to claim 19, the vehicle further including a third laterally-oriented fan in the first lateral channel and a fourth laterally-oriented fan in the second lateral channel, the method further comprising:
turning on the third and fourth laterally oriented fans and causing air from the first and second intake channels to pass through at least one of the third and fourth laterally oriented fans.

22. A method of operating a vehicle according to claim 19, comprising:
pitching a nose of the vehicle downward.

23. A method of operating a vehicle according to claim 19, comprising:
turning off some of the axial fans after achieving a threshold altitude.

24. A method of operating a vehicle according to claim 19, comprising:
pitching a nose of the vehicle upward;
increasing the magnitude of the thrust from the axial fans;
reducing the pitch to zero as horizontal motion slows; and
reducing thrust of the axial fans.

* * * * *